(12) United States Patent
Hunter

(10) Patent No.: US 12,245,684 B2
(45) Date of Patent: Mar. 11, 2025

(54) TOOTH BRUSHING SYSTEM

(71) Applicant: Cheryl Hunter, Brooklyn, NY (US)

(72) Inventor: Cheryl Hunter, Brooklyn, NY (US)

( * ) Notice: Subject to any disclaimer, the term of this patent is extended or adjusted under 35 U.S.C. 154(b) by 348 days.

(21) Appl. No.: 17/874,730

(22) Filed: Jul. 27, 2022

(65) Prior Publication Data

US 2023/0397714 A1 Dec. 14, 2023

Related U.S. Application Data

(60) Provisional application No. 63/350,573, filed on Jun. 9, 2022.

(51) Int. Cl.
*A46B 15/00* (2006.01)
*A46B 5/00* (2006.01)
*A46B 9/02* (2006.01)
*A46B 9/04* (2006.01)
*A46B 13/02* (2006.01)
*A46B 17/06* (2006.01)
*A46D 1/00* (2006.01)
*A61C 17/34* (2006.01)

(52) U.S. Cl.
CPC ............ *A46B 15/0036* (2013.01); *A46B 5/00* (2013.01); *A46B 9/026* (2013.01); *A46B 9/045* (2013.01); *A46B 13/023* (2013.01); *A46B 15/0091* (2013.01); *A46B 15/0095* (2013.01); *A46B 17/065* (2013.01); *A46D 1/0207* (2013.01); *A61C 17/3481* (2013.01); *A46B 2200/1066* (2013.01); *A61C 2204/002* (2013.01)

(58) Field of Classification Search
CPC .............. A46B 15/0095; A46B 17/065; A46B 15/0036; A46B 11/0041
USPC ............................................................. 15/4
See application file for complete search history.

(56) References Cited

U.S. PATENT DOCUMENTS

| | | | |
|---|---|---|---|
| 10,165,852 B1 * | 1/2019 | Christman | A46B 15/0091 |
| 2007/0111167 A1 * | 5/2007 | Russell | A61C 19/066 |
| | | | 433/29 |
| 2016/0317268 A1 * | 11/2016 | Dietzel | A61C 19/02 |
| 2021/0085168 A1 * | 3/2021 | Johnson | A61B 1/042 |

* cited by examiner

*Primary Examiner* — Andrew A Horton
(74) *Attorney, Agent, or Firm* — Brennan, Manna & Diamond, LLC

(57) ABSTRACT

The present invention relates to a tooth brushing system that provides users with a novel and convenient way to clean their teeth. The system is primarily comprised of at least one brushing ball with a plurality of bristles and at least one battery, at least one toothbrush which is further comprised of at least one LED and a plurality of bristles, and at least one storage case. The brushing ball is further comprised of a LED light that may be changed to a plurality of lighting colors. The system further provides a toothbrush that allows a user to be able to see into the darker areas of their mouth to facilitate better cleaning.

19 Claims, 3 Drawing Sheets

TOOTH BRUSHING SYSTEM

CROSS-REFERENCE TO RELATED APPLICATION

The present application claims priority to, and the benefit of, U.S. Provisional Application No. 63/350,573, which was filed on Jun. 9, 2022, and is incorporated herein by reference in its entirety.

FIELD OF THE INVENTION

The present invention relates generally to the field of toothbrushes. More specifically, the present invention relates to a tooth brushing system that provides users with a novel and convenient way to clean their teeth. The system is primarily comprised of at least one brushing ball with a plurality of bristles and at least one battery, at least one toothbrush which is further comprised of at least one LED and a plurality of bristles, and at least one storage case. The brushing ball is further comprised of an LED light that may be changed to a plurality of lighting colors. The system further provides a toothbrush that allows a user to be able to see into the darker areas of their mouth to facilitate better cleaning. Accordingly, the present disclosure makes specific reference thereto. Nonetheless, it is to be appreciated that aspects of the present invention are also equally applicable to other like applications, devices, and methods of manufacture.

BACKGROUND

By way of background, children and individuals with limited physical dexterity may have a difficult time brushing their teeth. Often other individuals must assist these individuals in brushing and cleaning their teeth. There is currently no alternative to help these individuals who struggle with brushing their teeth. Brushing teeth can also be very time-consuming, and when individuals are in a rush, they may not be able to clean their teeth effectively.

When individuals use standard toothbrushes, they are not able to see into the darker areas of the mouth. They must rely solely on feel to ensure that they are brushing the hard-to-reach areas of the mouth. This can cause individuals to miss large amounts of debris and bacteria. This can make the individual more susceptible to cavities and other mouth-related diseases. Creating a way to see into the darker areas of the mouth while brushing would eliminate this issue that standard toothbrushes create.

After individuals are done brushing their teeth, many germs and bacteria are left on the brush head. Without any proper way to remove the bacteria, the head can become filled with bacteria and germs. The individual then brushes repeatedly with the germ-filled brush head. This can create more health issues than there were before. There are limited ways to disinfect standard brush heads, and one is needed to be able to insure further mouth health.

Therefore, there exists a long-felt need in the art for an improved tooth brushing system. Further, there exists a long-felt need in the art for a brushing ball that allows children and other individuals who struggle with brushing their teeth to be able to clean their teeth sufficiently. There also exists a long-felt need in the art for a toothbrush that provides users with a way to see the darker areas of the mouth while brushing, thus leading to cleaner teeth. Further, there exists a long-felt need in the art for a case that can simultaneously clean the user's toothbrush and brushing ball, while housing them in a convenient location.

The subject matter disclosed and claimed herein, in one embodiment thereof, comprises a tooth brushing system. The system is primarily comprised of at least one brushing ball with a plurality of bristles and at least one battery, at least one toothbrush which is further comprised of at least one LED and a plurality of bristles, and at least one storage case. The brushing ball can be used as a toothbrush alternative, wherein the ball can be moved around the mouth of the user while the bristles clean the teeth of the user. The toothbrush further illuminates the mouth of the user via the LED.

In this manner, the tooth brushing system of the present invention accomplishes all of the foregoing objectives and provides a novel tooth brushing system that allows users to brush their teeth more effectively. The system also provides users with a way to brush their teeth on the go. In addition, the system provides a fun way of brushing teeth that does not involve a traditional toothbrush.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a tooth brushing system. The system is primarily comprised of at least one brushing ball with a plurality of bristles and at least one battery, at least one toothbrush which is further comprised of at least one LED and a plurality of bristles, and at least one storage case. The brushing ball is further comprised of an LED light that may produce a plurality of colors. The LED light allows a user to see where plaque and buildup are in their mouth, thereby allowing them to clean their mouth more efficiently. Further, the LED may change colors when a user bites down on the brushing ball. This may allow a user to change the LED light colors while in use.

The toothbrush is further comprised of a handle and a head. The handle and the head may be attachable/detachable via at least one fastener. The head may be comprised of a male fastener and the handle may be comprised of a female fastener. This allows users to be able to purchase a new head when theirs is getting old without purchasing a whole new system. Further, the toothbrush is comprised of a motor that allows the toothbrush to vibrate thus allowing for a more complete and deeper clean.

Further, the storage case is comprised of a UV light. The UV light helps to disinfect the brushing ball and the toothbrush when they are placed in the storage case. The UV light is further powered by at least one battery and is operated by at least one button. Further, the storage case is comprised of at least one fastener that allows the case to be attached to a wall, mirror, or counter in the bathroom, so the system is never misplaced.

Accordingly, the tooth brushing system of the present invention is particularly advantageous as it provides a user with a novel tooth brushing system. Further, the system provides children and other individuals with limited physical dexterity with a way to clean their mouth and teeth with minimal effort. It also provides users with a way to store the systems simultaneously while being disinfected. In this manner, the tooth brushing system overcomes the limitations of existing toothbrushes known in the art.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION

Figure 1:
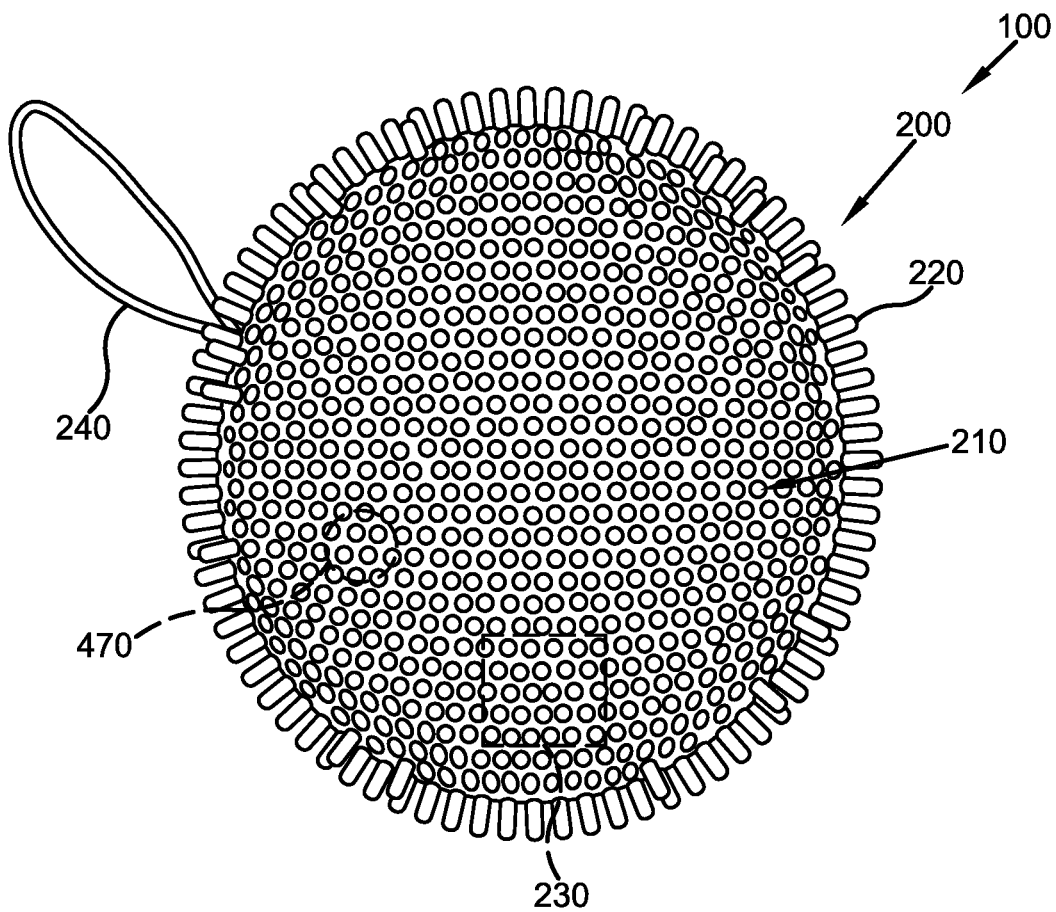
FIG. 1 illustrates a perspective view of a brushing ball of one potential embodiment of a tooth brushing system of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there exists a long-felt need in the art for an improved tooth brushing system. Further, there exists a long-felt need in the art for a brushing ball that allows children and other individuals who struggle with brushing their teeth to be able to clean their teeth sufficiently. There also exists a long-felt need in the art for a toothbrush that provides users with a way to see the darker areas of the mouth while brushing, thus leading to cleaner teeth. There also exists a long-felt need in the art for a case that can simultaneously clean the user's toothbrush and brushing ball, while housing them in a convenient location.

The present invention, in one exemplary embodiment, is comprised of a tooth brushing system. The system is primarily comprised of at least one brushing ball with a plurality of bristles and at least one battery. Further, the system is comprised of at least one toothbrush which is further comprised of at least one LED and a plurality of bristles. The system is also comprised of at least one storage case.

Referring initially to the drawings, FIG. 1 illustrates a perspective view of a brushing ball 200 of one potential embodiment of a tooth brushing system 100 of the present invention in accordance with the disclosed architecture. The system 100 is primarily comprised of at least one brushing ball 200 with a plurality of bristles 220, at least one LED 470, and at least one battery 230. The outer surface 210 of the brushing ball 200 is comprised of a plurality of bristles 220. The bristles 220 and/or ball 200 may be any color known in the art for identification purposes. However, the bristles 220 are preferably transparent. The bristles 220 may be manufactured from either a natural bristle material or a synthetic bristle material. The natural bristle material that may be used may be any nature bristle material known in the art such as, but not limited to: bamboo, broomcorn, yucca, rattan, boar hair, etc. There are also a plurality of synthetic materials that may be used such as, but not limited to: polypropylene, polyvinyl chloride, poly corn, nylon, styrene, etc. During use, a user places the brushing ball 200 in their mouth and then chews on the brushing ball 200 which allows the bristles 220 to clean the user's teeth. The brushing ball 200 may further be manufactured in any shape known in the art but is preferably spherical.

The brushing ball 200 is further comprised of at least one LED light 470. The LED light 470 can be any LED light 470 known in the art. The LED light 470 can be turned on when a user chews on the brushing ball 200. In one embodiment, the LED light 470 may change colors when the user applies pressure to the brushing ball 200 (i.e., each chew would change the color). The LED light 470 may emit a plurality of different colors such as, but not limited to: blue, red, green, purple, yellow, orange, etc. The LED light 470 is further powered by at least one battery 230. The battery 230 can be in the form of an alkaline, nickel-cadmium, nickel-metal hydride battery, etc., such as any 3V-12-volt DC battery 230 or other conventional battery 230 such as A, AA, AAA, etc., that supplies power to the LED light 470. Throughout this specification, the terms "battery" and "batteries" may be used interchangeably to refer to one or more wet or dry cells or batteries 230 of cells in which chemical energy is converted into electricity and used as a source of DC power. References to recharging or replacing batteries 230 may refer to recharging or replacing individual cells, individual batteries 230 of cells, or a package of multiple battery cells as is appropriate for any given battery 230 technology that may be used.

In one embodiment, the brushing ball 200 may be attached to a lanyard 240. The lanyard 240 may go around a user's neck to help prevent choking wherein if a user swallows the brushing ball 200. If so, they can pull the brushing ball 200 out of their throat with the lanyard 240. The lanyard 240 may be manufactured from any lanyard material known in the art.

Figure 2:
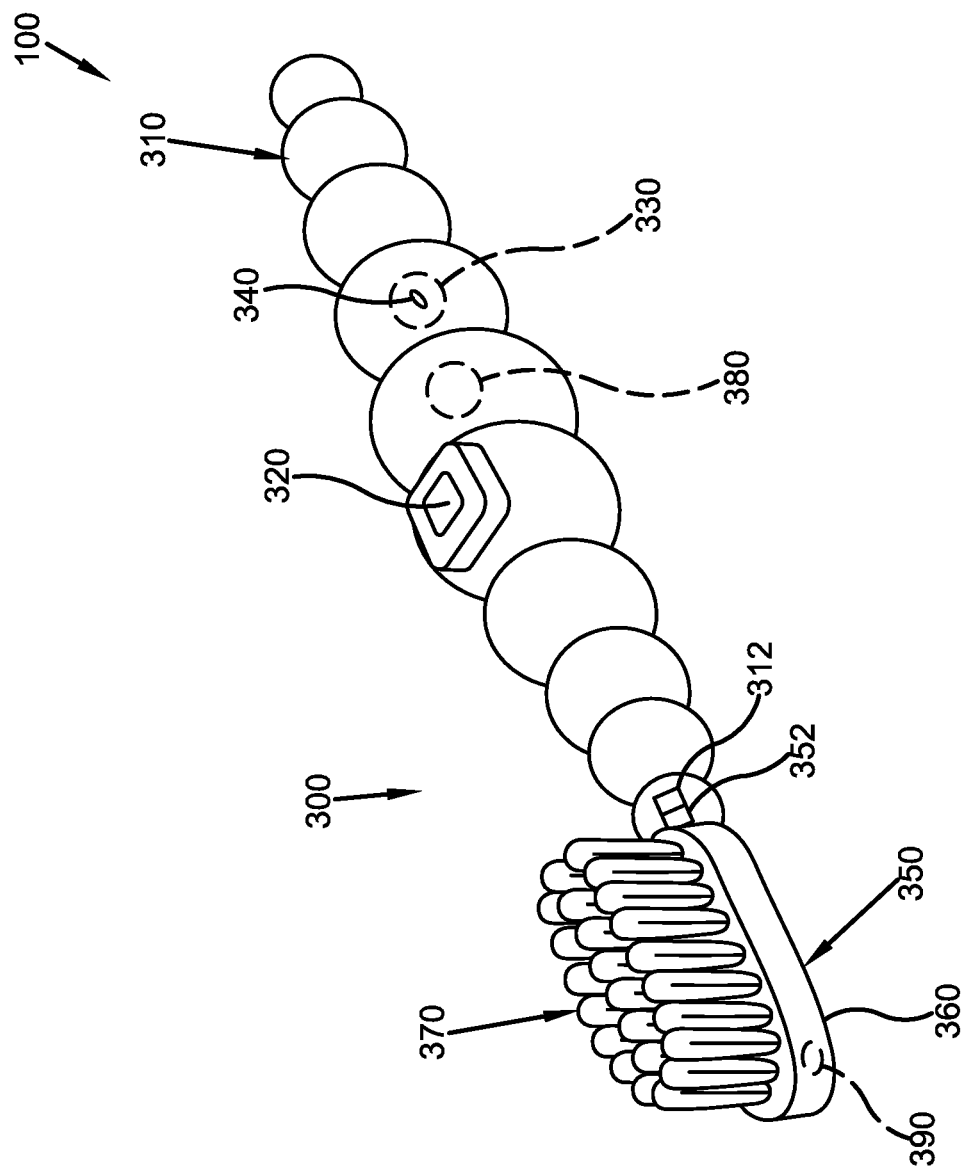
FIG. 2 illustrates a perspective view of a toothbrush of one potential embodiment of a tooth brushing system of the present invention in accordance with the disclosed architecture.

FIG. 2 illustrates a perspective view of a toothbrush 300 of one potential embodiment of a tooth brushing system 100 of the present invention in accordance with the disclosed architecture. The system 100 is comprised of at least one battery 230, at least one toothbrush 300 which is further comprised of at least one LED 390 and a plurality of bristles 370. Further, the toothbrush 300 is comprised of a handle 310, at least one button 320, at least one motor 380, and at least one head 350.

The toothbrush 300 is comprised of a plurality of bristles 370. The bristles 370 may be any color known in the art but are preferably transparent. The bristles 370 may be manufactured from either natural bristle material or synthetic bristle material. The synthetic materials that may be used are any synthetic bristle material known in the art such as, but not limited to: polypropylene, polyvinyl chloride, poly corn, nylon, styrene, etc. There are also a plurality of natural bristle material that may be used may be any nature bristle material known in the art such as, but not limited to: bamboo, broomcorn, yucca, rattan, boar hair, etc.

The toothbrush is further comprised of a head 350. The head 350 houses the bristles 370 and the LED light 390. The head 350 can be made from any toothbrush material known in the art, but in the preferred embodiment is made from a plastic material. There are a plurality of plastic materials that may be used such as, but not limited to: acrylic, polycarbonate, polyethylene, thermoplastic, acrylonitrile butadiene styrene, low density polyethylene, medium density polyethylene, high density polyethylene, polyethylene terephthalate, polyvinyl chloride, polystyrene, polylactic acid, acetal, nylon, fiberglass, etc.

The head 350 may be comprised of at least one LED light 390. The LED light 390 can be any LED light 390 known in the art. The LED light 390 may emit a plurality of different colors such as, but not limited to: blue, red, green, purple, yellow, orange, etc. The LED light 390 is further powered by at least one battery 330. In the preferred embodiment, the LED light 390 can be operated by at least one button 320. In another embodiment, the LED light 390 is operated by the user by squeezing the handle 310. When a user applies pressure to the handle 310, the LED light 390 will turn on. In one embodiment, the LED light 390 may change colors every time the user presses the button 320 or squeezes the handle. In another embodiment, there may be a plurality of buttons 320 wherein each button 320 represents a different color the LED light 390 can change to. The LED 390 may further pulse, strobe, or continuously illuminate in response to button 320 presses or squeezes.

The toothbrush 300 may further be comprised of a rear surface 360 located on the back of the head 350. The rear surface 360 may be manufactured from any textured raised plastic known to one skilled in the art. The rear surface 360 allows a user to be able to scrape germs and bacteria off the surface of their tongue and gums.

The toothbrush 300 is further comprised of a handle 310, further comprised of at least one battery 330, at least one button 320, a motor 380, and a USB port 340. The handle 310 can be made from a plurality of materials such as, but not limited to: wood, plastic, metal, rubber, etc. In the preferred embodiment, the handle 310 is made from a rubber material such as, but not limited to: natural rubbers, neoprene rubber elastomer, silicone rubber elastomer, ethylene propylene diene monomer rubber, butyl rubber, nitrile rubber, buna-n rubber, styrene-butadiene rubber elastomers, Viton rubber elastomer, diaphragm rubber, thermoplastic rubber, etc. The handle 310 may be any size or shape known to one skilled in the art. In one embodiment, the handle 310 is comprised of a plurality of rubber balls to provide grip for the user. In another embodiment, the handle 310 is comprised of a textured grip area located on the body. In yet another embodiment, the handle 310 is in the shape of a normal standard toothbrush.

In addition to powering the LED light 390, the battery 330 may also supply power to the motor 380. Further, the battery 330 may be rechargeable via a USB port 340. The USB port 340 can be any USB port such as, but not limited to, micro-USB, USB B, USB C, or any other suitable charging port that is known in the art.

The button 320 may further be used to operate the motor 380. In one embodiment, there may be one button 320 that is used to operate both the LED light 390 and the motor 380. In another embodiment, there may be a plurality of buttons that are used to control the LED light 390 and the motor 380. Further, in another embodiment, the motor 380 may have varying levels of vibration intensity that a user can control with the button 320. Further, the motor 380 may be any motor known to one skilled in the art.

In one embodiment, the toothbrush 300 may have a wider head 350 and shorter bristles 370. The wider head 350 and shorter bristles 370 are better optimized for tongue brushing rather than toothbrushing. This embodiment has all other features of the previously described toothbrush 300 embodiment.

In one embodiment, the head 350 can be attached to the handle 310 via at least one fastener 352. The head 350 is comprised of a male fastener 352 and the handle 310 is comprised of a reciprocating female fastener 352. The fasteners 312, 352 allow a user to be able to replace the head 350 of the toothbrush when the bristles 370 go bad without replacing the entire toothbrush. The fasteners 312, 352 may be any fasteners known in the art such as, but not limited to: magnetic, snap button, hook and loop, etc.

Figure 3:
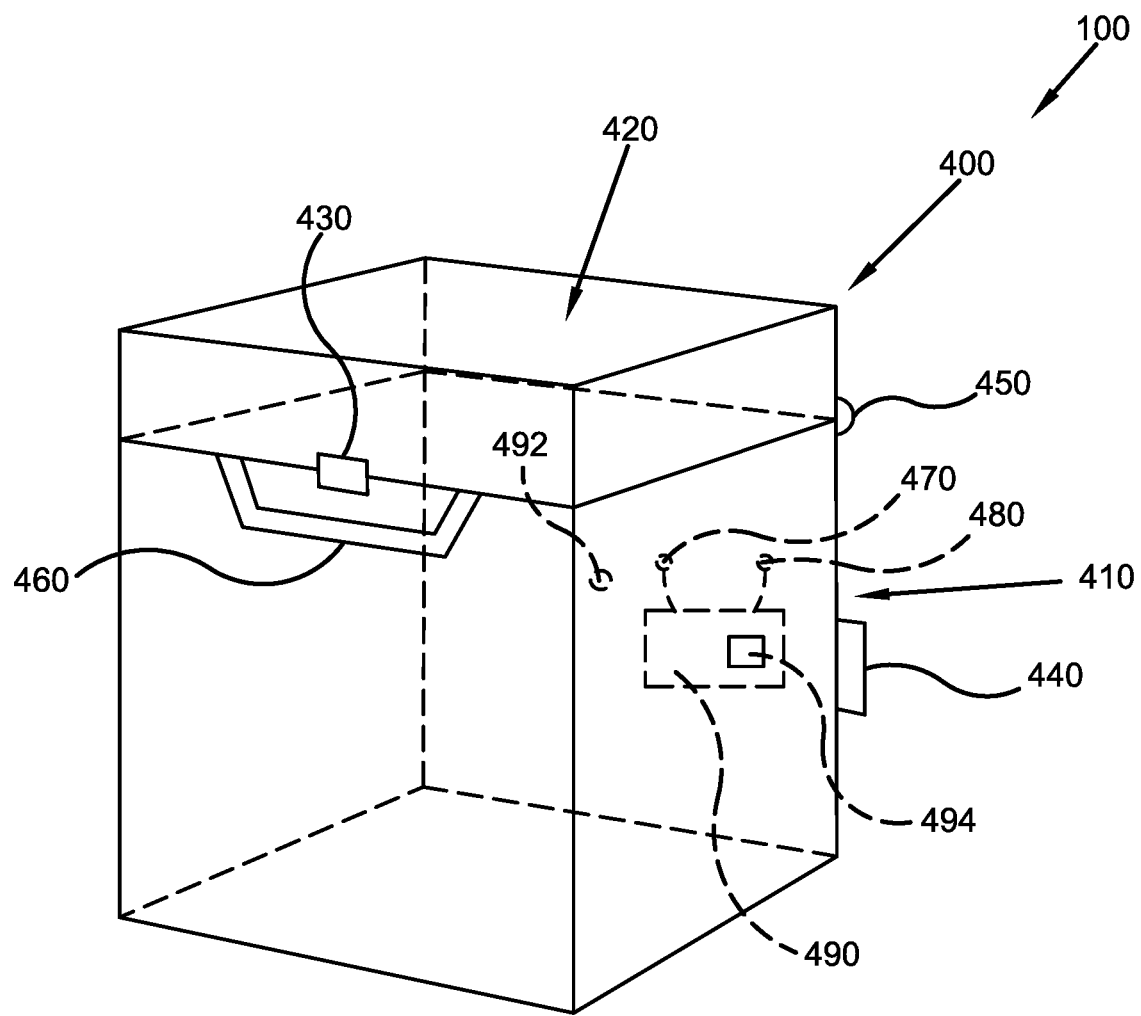
FIG. 3 illustrates a perspective view of a case of one potential embodiment of a tooth brushing system of the present invention in accordance with the disclosed architecture.

FIG. 3 illustrates a perspective view of a case 400 of one potential embodiment of a tooth brushing system 100 of the present invention in accordance with the disclosed architecture. The case 400 is further comprised of a body 410, further comprised of a lid 420, at least one lid fastener 430, at least one hinge 450, at least one handle 460, at least one UV light 470, at least one battery 490, at least one button 492, and at least one fastener 440.

The body 110 may be any shape known in the art but is preferably square. The body 110 is further manufactured from a plastic material, but may be manufactured from any material known in the art. There are a plurality of plastic materials that may be used such as, but not limited to: acrylic, polycarbonate, polyethylene, thermoplastic, acrylonitrile butadiene styrene, low density polyethylene, medium density polyethylene, high density polyethylene, polyethylene terephthalate, polyvinyl chloride, polystyrene, polylactic acid, acetal, nylon, fiberglass, etc.

The case 400 is further comprised of a lid 420 that provides the user with a way to shut the case 400 to keep out unwanted germs and bacteria. Further, the lid 420 is opened/closed via at least one hinge 450. There are a plurality of hinges 450 that may be used such as, but not limited to: an offset blind hinge, a knuckle hinge, a butt hinge, a rising butt hinge, a gravity pivot hinge, a ball bearing hinge, a barrel hinge, a concealed hinge, a knife hinge, a piano hinge, a strap hinge, a pivot hinge, a gas-piston hinge, an injection molded hinge, a locking hinge, etc. The lid 420 also is comprised of at least one lid fastener 430 that holds the lid 420 in the closed position. The lid fasteners 430 that may be used are any fasteners known in the art.

The case 400 may also be comprised of at least one handle 460 that allows the user to move the device, or to open the lid 420. The handle 460 may be any handle known in the art. Further, the case 400 may be comprised of at least one fastener 440 that provides a way for the user to attach the case 440 to a wall, mirror, counter, or other surface in the bathroom so the case 400 does not get lost or fall and break. The type of fastener 440 that may be used is any fastener such as, but not limited to: magnetic, adhesive, hook and loop, suction cup, etc. In one embodiment, the fastener 440 may allow the case 400 to attach to a least one other case 400. In this manner, a plurality of cases 400 can be secured to one another in a stacked, row, or other fashion. This allows cases 400 to be conveniently stored. In differing embodiments, this fastener 440 may be fasteners such as but not limited to: suction cup, adhesive, magnetic, hook and loop, tongue and groove, a snap fastener, etc. Said fastener 440 may be present on any surface of the case 400.

The case 400 is further comprised of at least one UV light 480 that is located inside the case 400. The UV light 480 functions as a way to disinfect the brushing ball 200 and/or the toothbrush 300. The UV light 480 may be any light that is known in the art to disinfect objects. The UV light 480 cleans the system by killing any bacteria or germs that are left on the brushing ball 200 or the toothbrush 300 after use. The UV light 480 is further powered by at least one battery 490. Further, the battery 490 can be recharged by a USB port 494. The USB port 494 can be any USB port such as, but not limited to, micro-USB, USB B, USB C, or any other suitable charging port that is known in the art. The case 400 is further comprised of at least one button 492. The button 492 is used to operate the UV light 480. In one embodiment, the button 492 may be used to turn the UV light 480 on and off. In another embodiment, the button 492 may be used to also change the intensity of the UV light 480. In yet another embodiment, there may be multiple batteries 492 wherein, one turns the UV light 480 off and one turns the intensity up or down. It is also contemplated that the same principles may be applied to a tongue brush that is also comprised of an LED, but that has a wider head and shorter bristles.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "tooth brushing system" and "system" are interchangeable and refer to the tooth brushing system 100 of the present invention.

Notwithstanding the foregoing, the tooth brushing system 100 of the present invention and its various components can be of any suitable size and configuration as is known in the art without affecting the overall concept of the invention, provided that they accomplish the above-stated objectives. One of ordinary skill in the art will appreciate that the size, configuration, and material of the tooth brushing system 100 as shown in the FIGS. Are for illustrative purposes only, and that many other sizes and shapes of the tooth brushing system 100 are well within the scope of the present disclosure. Although the dimensions of the tooth brushing system 100 are important design parameters for user convenience, the tooth brushing system 100 may be of any size, shape and/or configuration that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A tooth brushing system comprising:
    a brushing ball comprised of an outer surface, a plurality of bristles positioned along the outer surface, and an LED;
    a toothbrush comprised of a plurality of bristles, a motor and an LED; and
    a case comprising a UV light.

2. The tooth brushing system of claim 1, wherein the plurality of bristles of the brushing ball is transparent.

3. The tooth brushing system of claim 1, wherein the plurality of bristles of the toothbrush is transparent.

4. A tooth brushing system comprising:
    a brushing ball comprised of an outer surface, a plurality of bristles, an LED and a battery;
    a toothbrush comprised of a plurality of bristles, a motor and an LED; and
    a case comprised of a UV light, a battery, a lid and a hinge.

5. The tooth brushing system of claim 4, wherein the plurality of bristles of the brushing ball are comprised of a bamboo, a broomcorn, a yucca, a rattan, a boar hair, a polypropylene, a polyvinyl chloride, a poly corn, a nylon or a styrene material.

6. The tooth brushing system of claim 4, wherein the brushing ball is spherical.

7. The tooth brushing system of claim 4, wherein the LED of the brushing ball is activated by a pressure applied to the outer surface.

8. A tooth brushing system comprising:
    a brushing ball comprised of an outer surface, a plurality of bristles, a lanyard, an LED and a battery;
    a toothbrush comprised of a plurality of bristles, a head, a handle, a motor, a button and an LED; and
    a case comprised of a UV light, a battery, a lid and a hinge.

9. The tooth brushing system of claim 8, wherein the plurality of bristles of the toothbrush are comprised of a bamboo, a broomcorn, a yucca, a rattan, a boar hair, a polypropylene, a polyvinyl chloride, a poly corn, a nylon or a styrene material.

10. The tooth brushing system of claim 8, wherein the LED of the brushing ball illuminates a first color and a second color.

11. The tooth brushing system of claim 8, wherein the LED of the toothbrush illuminates a first color and a second color.

12. The tooth brushing system of claim 8, wherein a rear surface of the toothbrush is comprised of a textured, raised plastic.

13. The tooth brushing system of claim 8, wherein the toothbrush further comprises a USB port.

14. The tooth brushing system of claim 8, wherein the handle is comprised of a rubber ball.

15. The tooth brushing system of claim 8, wherein the motor has a vibration intensity level.

16. The tooth brushing system of claim 8, wherein the case is further comprised of a fastener.

17. The tooth brushing system of claim 16, wherein the fastener is a select one of a magnetic fastener, an adhesive fastener, a hook and loop fastener, or a suction cup fastener.

18. The tooth brushing system of claim 8, wherein the battery of the case is further comprised of a USB port.

19. The tooth brushing system of claim 8, wherein the LED of the brushing ball and the LED of the toothbrush can pulse, strobe, or continuously illuminate.

\* \* \* \* \*